United States Patent [19]

Huynh et al.

[11] Patent Number: 4,680,694
[45] Date of Patent: Jul. 14, 1987

[54] OZONATOR POWER SUPPLY

[75] Inventors: Anh N. Huynh, Edgewood, Ky.; Phoivos D. Ziogas, Brossard, Canada

[73] Assignee: National Distillers and Chemical Corporation, New York, N.Y.

[21] Appl. No.: 725,737

[22] Filed: Apr. 22, 1985

[51] Int. Cl.[4] .......................................... H02M 7/521
[52] U.S. Cl. ..................................... 363/136; 363/132; 422/186.16
[58] Field of Search ..................... 323/266; 363/17, 27, 363/28, 80, 96, 98, 136, 138, 132; 422/186.15, 186.16

[56] References Cited

U.S. PATENT DOCUMENTS

| | | | |
|---|---|---|---|
| 2,615,841 | 10/1952 | Thorp et al. | 204/176 |
| 3,496,092 | 2/1970 | Fraser | 422/186.16 |
| 4,156,899 | 5/1979 | Matsuda et al. | 363/138 |
| 4,191,994 | 3/1980 | Kratz et al. | 363/138 |
| 4,204,266 | 5/1980 | Kammiller et al. | 363/98 |
| 4,295,049 | 10/1981 | Ebersberger et al. | 250/409 |
| 4,404,623 | 9/1983 | Jourdan | 363/80 |
| 4,442,483 | 4/1984 | Baumann et al. | 363/136 |
| 4,455,526 | 6/1984 | Miller | 363/86 |
| 4,460,949 | 7/1984 | Steigerwald | 363/28 |
| 4,477,868 | 10/1984 | Steigerwald | 363/96 |
| 4,564,800 | 1/1986 | Jurjans | 363/17 |

Primary Examiner—Patrick R. Salce
Assistant Examiner—Jeffrey Sterrett
Attorney, Agent, or Firm—Kenneth D. Tremain; Gerald A. Baracka

[57] ABSTRACT

A versatile pulsed voltage resonant inverter power supply for an ozonator which results in the efficient operation thereof. A resonant inverter ozonator power supply comprises a DC power source and a DC/AC thyristor inverter coupled at its outputs to the primary winding of a high voltage transformer. The ozonator load is connected across the secondary winding of transformer and provides a discharge path during each high frequency cycle. First and second embodiments of control circuits are disclosed for generating gating control signals for the thyristors. The switching frequency at which the thyristors are triggered is selected to be lower than the circuit resonant frequency in order that the load voltage supplied by the inverter is substantially pulsed, and a pulse burst modulation mode is also disclosed.

9 Claims, 8 Drawing Figures

OZONATOR POWER SUPPLY

BACKGROUND OF THE INVENTION

1. Field of the Invention

The present invention relates generally to a solid state power supply circuit for a corona discharge device such as an ozonator, and more particularly pertains to an audio frequency, thyristor inverter power supply circuit employing an inverter control circuit for controlling gating of the thyristors.

2. Description of the Prior Art

It is known in the art that ozone can be produced by the passage of oxygen or air between two electrodes, between which an electrical corona discharge is maintained. Other processes for producing ozone, such as by spark discharge or by action of ultra-violet radiation, have not been of great industrial significance because the ozone yield is considerably lower. The production of ozone by a corona discharge is of considerable importance in broad areas of industry, for water treatment in the preparation of drinking water, and for water purification and sterilization.

The basic physical principles for synthesizing ozone by passing pure oxygen or other oxygen-containing gases such as air through a corona discharge device have been known for many years. In a typical corona discharge ozonator, a corona discharge is maintained across a gap between two electrodes and is characterized by a low current induced by a sufficiently large voltage gradient to cause an electrical corona discharge across the gas. The gas is only slightly ionized thereby and a diffused soft bluish glow results. The high voltages employed to operate corona discharge ozonators have frequently been obtained by passing a periodic signal of some type through the primary side of a step-up power transformer and connecting the ozonator load across the periodic high voltage available on the secondary side of the transformer.

Over the years, significant efforts have been made to refine ozone generators and the power supplies therefor which form an integral part of their operating circuitry. These efforts have been particularly directed at increasing their efficiency to reduce both their cost of operation and the cost of manufacture of ozone per unit of power consumed. Many factors have contributed to setting prior art limitations of efficiency, including the characteristics of the voltage and current periodic waveforms.

Ozone forms according to a triple collision theory, pursuant to which oxygen molecules are accelerated in an alternating electric field, and three molecules of oxygen ($O_2$) reform to two molecules of ozone ($O_3$). The formation of ozone generally occurs in the last part of an acceleration phase when the corona discharge has built up a sufficient field strength, which occurs relatively late with sinusoidal AC voltages furnished from a commercial AC line voltage, or from a voltage derived therefrom in a multiplying operation producing a frequency of up to several hundred hertz.

Ozone generating systems operating at higher frequencies generally produce higher ozone yields, with normal AC line voltage, since the acceleration per unit time appears more frequently. However, because the corona power dissipated in a gaseous gap in series with a dielectric barrier is directly proportional to the operating frequency, any significant heating produced by this corona power tends to promote the rapid decomposition of ozone produced therein. Thus, the duration of the discharge in relation to the duration of the period of the alternating current applied to the ozonator is an important factor in the efficiency of the production of ozone.

SUMMARY OF THE INVENTION

It is a primary object of the present invention to provide a versatile pulsed voltage resonant inverter power supply for an ozonator which results in the efficient operation thereof.

Another object of the subject invention is the provision of a gating control circuit for a thyristor inverter power supply for an ozonator wherein the ozonator provides a portion of the commutating capacitance for the inverter, as well as being the load thereof.

In accordance with the teachings herein, a resonant inverter ozonator power supply circuit comprises a DC power source and a DC/AC thyristor inverter coupled at its outputs to the primary winding of a high voltage transformer. The ozonator load, which has an equivalent electrical circuit of a resistance $R_g$ of the discharge gap in combination with a capacitor $C_d$ of the dielectric barrier connected in series with a capacitor $C_g$ of the discharge gap, is connected across the secondary winding of the transformer and provides a discharge path during each high frequency cycle. The inverter power supply operates at a relatively high frequency determined by the series resonant frequency of a series connected commutating inductance and capacitance which are the leakage inductance of the high voltage transformer and the equivalent capacitance of a series capacitor and the reflected load capacitance. Different capacitors can be selectively connected in series with the primary winding of the transformer to generate different resonant frequencies.

A control circuit is provided for generating gating control signals for the two pairs of thyristors. The switching frequency at which the thyristors are triggered is selected to be lower than the circuit resonant frequency in order that the load voltage supplied by the inverter is substantially pulsed.

In a first preferred embodiment of the control circuit, a square wave generator generates first and second opposite square wave signals. A first edge detecting circuit is coupled to the first square wave signal for producing a first gating pulse for each detected edge, which is then coupled to gate the first pair of thyristors. A second edge detecting circuit is coupled to the second square wave signal for producing a second gating pulse for each detected edge, which is then coupled to gate the second pair of thyristors. In this embodiment, the square wave generator preferably comprises an astable multivibrator for generating the two opposite square wave signals. In preferred modes of operation thereof, a capacitor and an inductor are coupled to the primary winding of the transformer to tune the resonant frequency of the resonant network to the range of 2.0 to 3.0 kilohertz, and the square wave generator preferably operates between two hundred and eight hundred hertz.

In a second preferred embodiment of the control circuit, first and second pairs of AND gates are provided for controlling the gating of the first and second pairs of thyristors. A switching frequency square wave signal is generated and applied as a first input to each of the first and second pairs of AND gates. A high frequency pulse train is also generated and applied as a second input to each of the first and second pairs of AND gates. The resultant gating signals from the AND gates trigger the first and second pairs of thyristors in a pulse burst modulation mode wherein the switching frequency of the square wave signal controls the timing between pulse bursts, and the number of high frequency pulses within each pulse burst is controlled by the frequency of the high frequency pulse train or the width of each pulse in the square wave signal.

In this embodiment, the generation of the high frequency pulse train is preferably synchronized with the pulses of the square wave signal. The square wave signal generator preferably comprises a pulse width modulator for generating two out-of-phase square wave signals, which are then coupled together to produce a single square wave signal. A capacitor and an inductor are coupled to the primary winding of the transformer to tune the resonant frequency of the resonant network to the range of 2.0 to 3.0 kilohertz, and the pulse repetition frequency of the high frequency pulse train is preferably one-half ($\frac{1}{2}$) the resonant frequency. The switching frequency is preferably between two hundred and eight hundred hertz, and the pulse repetition frequency of the high frequency pulse train is preferably between 1.0 and 1.6 kilohertz.

BRIEF DESCRIPTION OF THE DRAWINGS

The foregoing objects and advantages of the present invention for an ozonator power supply may be more readily understood by one skilled in the art, with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

A first embodiment of a pulse control circuit pursuant to the present invention is designed to provide an ozonator load with discontinuous higher frequency alternating current pulses, with each current pulse and associated voltage pulse having waveforms of the type shown in FIGS. 2(e) and 2(f). The frequency of the current is determined by a series resonant circuit comprising a series inductance which includes the effective inductance of a high voltage transformer and an optional additional inductor L, and a series capacitance including an optional series capacitor C, and the effective capacitance of the ozonator.

Figure 3:
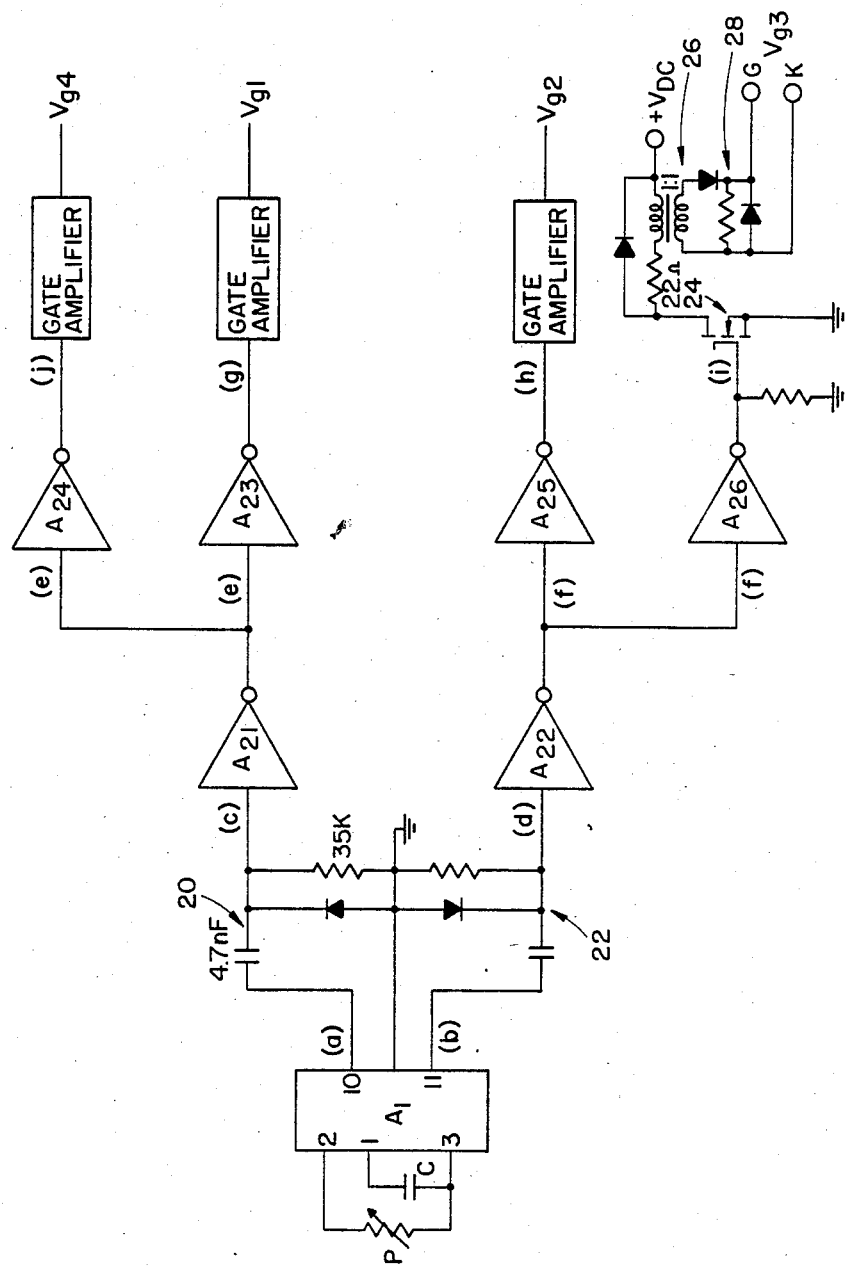
FIG. 3 is a schematic diagram of a first embodiment of a control circuit for delivering timing and control pulses to the circuit of FIG. 1.
Figure 6:
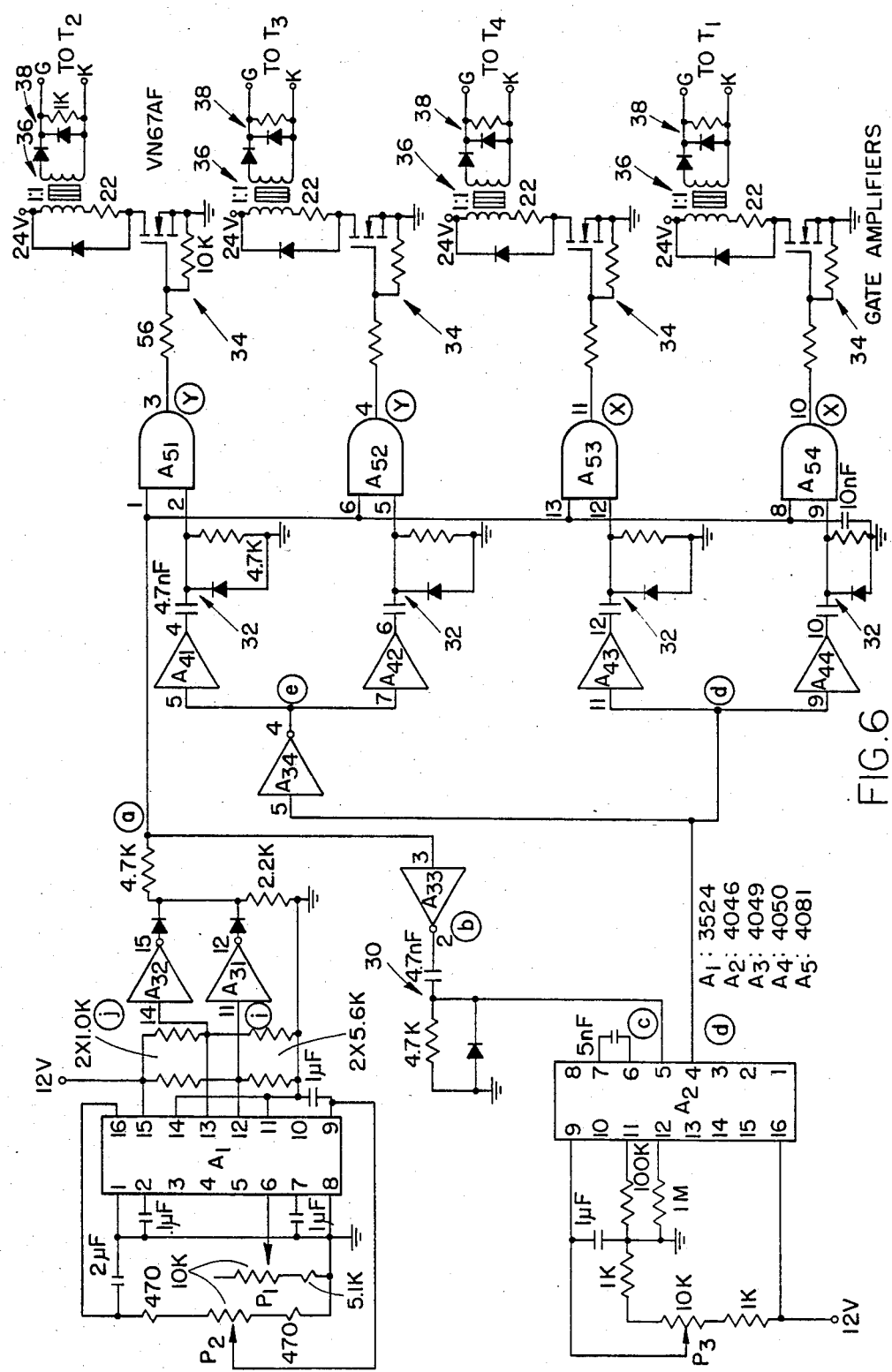
FIG. 6 is a schematic diagram of a second embodiment of a control circuit for delivering timing and control pulses to the circuit of FIG. 1 for operation in the pulse burst modulation mode.

The schematic circuits disclosed herein in FIGS. 3 and 6 give the values of many of the resistors and capacitors shown therein, and additionally give the commercial designations of many of the transistors and integrated circuits which are components of the circuits.

Figure 1:
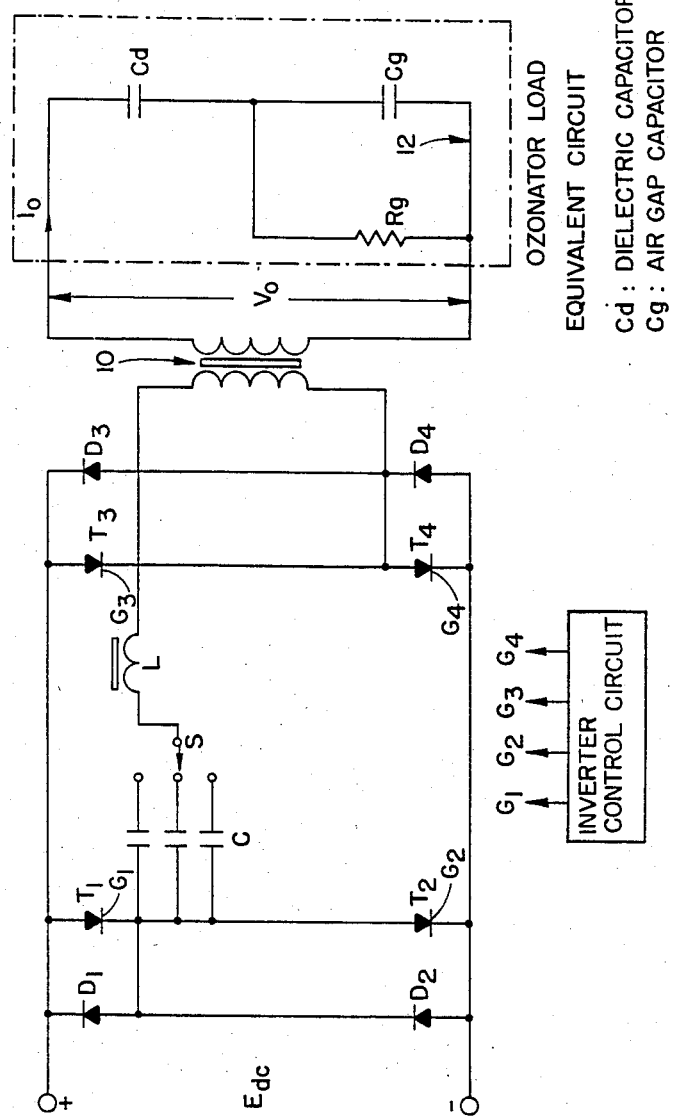
FIG. 1 is a circuit diagram of a full bridge thyristor inverter power supply circuit.

A commercial three phase 220V AC power source can be applied to an AC/DC converter, not shown, to produce a DC voltage $E_{dc}$, FIG. 1, for example 300 $V_{dc}$. Voltage pulses $V_o$ of alternating polarity, shown in FIG. 2(e), are produced by a thyristor bridge inverter, FIG. 1, comprised of thyristors $T_1$, $T_2$, $T_3$ and $T_4$ and diodes $D_1$, $D_2$, $D_3$ and $D_4$ connected in an antiparallel arrangement as shown.

Thyristors are electronic switching devices requiring short gating pulses of control or gate current to trigger them. When the control or gate current pulse ceases, the thyristor continues to conduct until it is subsequently commutated or turned off. A commutation circuit is frequently required to turn off the thyristors. In effect, thyristors are switches, the two most important of which are silicon controlled rectifiers (SCRs) and triacs. The thyristors, which are preferably silicon controlled rectifiers (SCRs), are used as the main switching devices of this power supply circuit, and commutation of the thyristors is accomplished automatically during the operation of the resonant circuit.

In operation, thyristors $T_1$ and $T_4$ are turned on simultaneously by control pulses $V_{g1}$ and $V_{g4}$, FIGS. 2(a), 2(b), creating a resonant current flow, FIG. 2(f), through the thyristor/diode pair. A series resonant circuit is established when either set of diagonally opposite switching legs of the bridge circuit are conductive. As the alternate pairs of thyristors are gated on, assuming first thyristors $T_1$ and $T_4$, followed by thyristors $T_2$ and $T_3$, a resonant system is established in the common branch of the bridge between the capacitor C, inductor L, the inductance of the transformer, and the reflected load capacitance combination. As energy is exchanged between L and C, and the thyristors and diodes alternately conduct current, the current in the common branch of the bridge resonates sinusoidally, as shown by $I_o$ in FIG. 2(f). Thus, the thyristor current increases to a maximum and decreases to zero, at which point the antiparallel diode circuits begin to conduct the negative component of the resonant current. The antiparallel diodes must remain in conduction for a period of time sufficient for the thyristors to regain their forward blocking voltage capability. With the thyristors commutated or turned off, further current flow in that leg of the bridge is blocked until the thyristor pair is later triggered again. By alternately turning on the pairs of diagonally opposite thyristors, alternating polarity voltage pulses $V_o$, with associated sinusoidal current pulses $I_o$, will consequently be imposed on the load, FIGS. 2(e), 2(f). The outputs of the thyristors $T_1$, $T_4$ and $T_2$, $T_3$ are directed through a step-up power transformer 10 to an ozonator load 12 having the equivalent circuit shown in FIG. 1. A thyristor inverter power supply of this type has the advantageous features that it is self-commutating and simple, and provides a relatively reliable and efficient ozonator power supply circuit.

The ozonator load has an equivalent electrical circuit of a resistance $R_g$ of the discharge gap in combination with a capacitor $C_d$ of the dielectric barrier connected in series with a capacitor $C_g$ of the discharge gap. The resonant frequency $F_R$ of the circuit is determined by an L, C (FIG. 1) combination and by the capacitance of the ozonator load, as reflected back through the transformer 10. The chosen values of the L, C combination allow the selection of a particular resonant frequency $F_R$ to maximize the production of ozone in the ozonator. For this selection, any one of a plurality of different capacitors C can be selected by a switch S to be coupled to the primary winding of the transformer 10 to tune the resonant frequency of the resonant circuit to the range of 2.0 to 3.0 kilohertz. As a practical matter, the cyclic switching frequency would normally be selected to be in the range of 200 to 800 $H_z$. Higher frequencies of $F_R$ may also be suitable, and may even be advantageous. The switching frequency $F_s$ would normally be chosen to be in the aforementioned range generally in dependence upon the transit time it takes for ozone generated with each pulse to be evacuated from the active area of ozonator.

In one working example, with a total circuit inductance of approximately 1.8 mH, C=20 mF, Cd=10.6 nF and Cg=1.6 nF, the frequency is approximately 2.5 $KH_z$ and the resistance $R_g$ is approximately 13.4 Kohms at maximum power loading.

Figure 2:
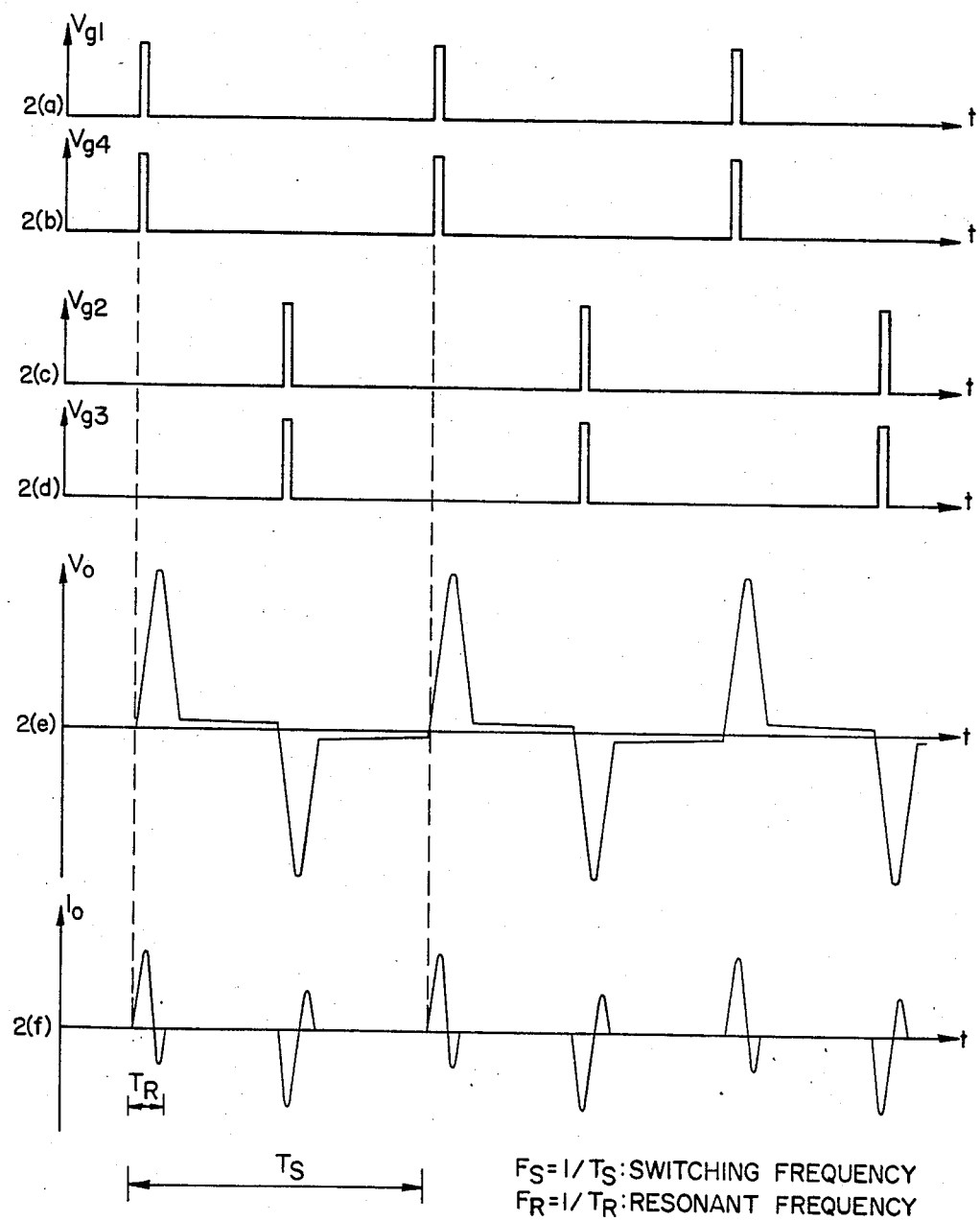
FIG. 2 illustrates various waveforms which are associated with and are useful in explaining one mode of operation of the thyristor inverter circuit of FIG. 1.

The function of the inverter control circuit of FIG. 3 is to generate two pairs of opposite (180° out-of-phase) gating pulses ($V_{g1}$, $V_{g4}$ and $V_{g2}$, $V_{g3}$) in order to simultaneously trigger the thyristor inverter circuit. The inverter control circuit of FIG. 3 uses a 4047 astable multivibrator chip and a 4049 hex inverting buffer chip, and is implemented in a relatively simple circuit in such a manner that it produces the required pulses as shown in FIG. 2, $V_{g1}$, $V_{g4}$ and $V_{g3}$, $V_{g2}$.

Figure 4:
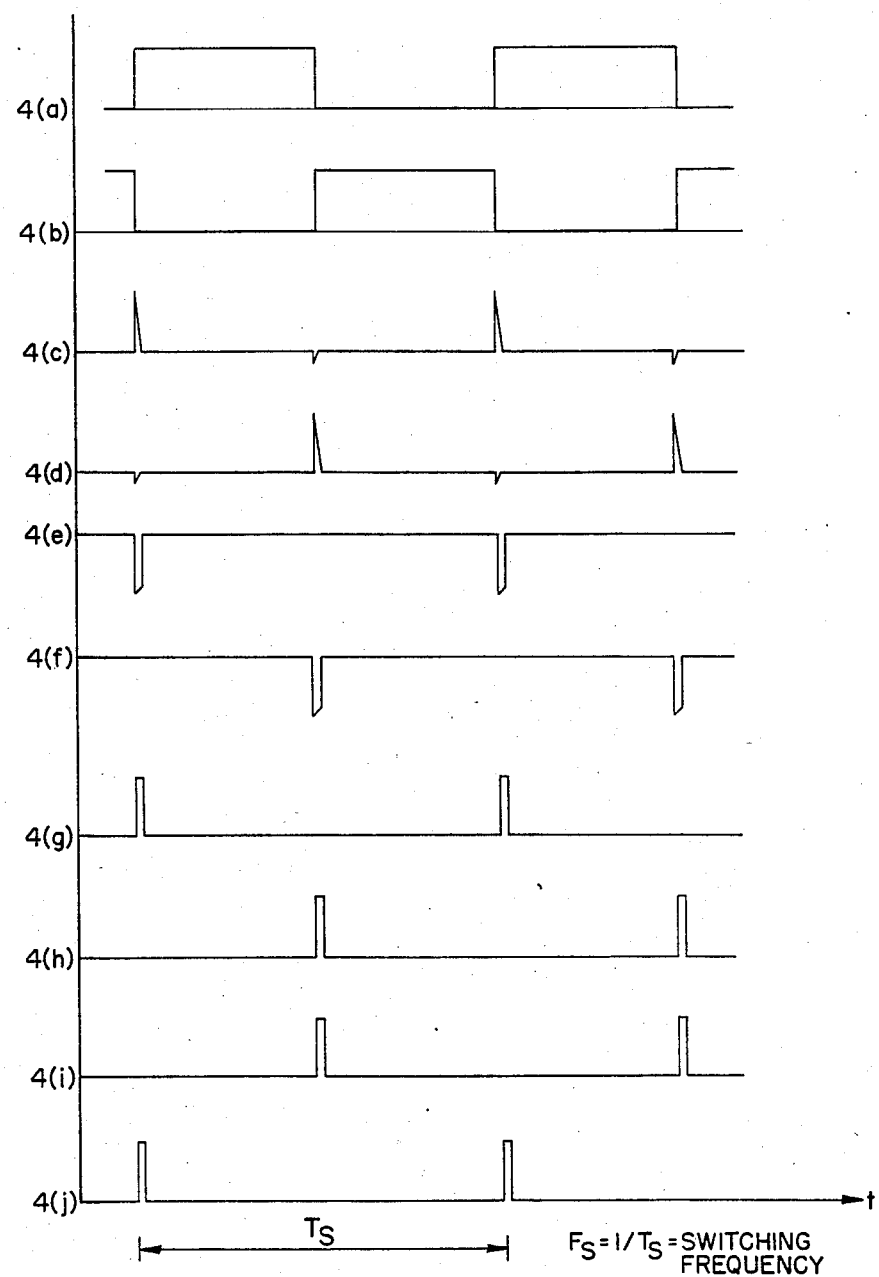
FIG. 4 illustrates various waveforms which are associated with and are useful in explaining the operation of the control circuit of FIG. 3.

Referring to FIGS. 3 and 4, a pair of opposite square wave signals (a), (b), FIG. 4(a) and FIG. 4(b), are generated by the 4047 astable multivibrator integrated circuit ($A_1$), and are edge-detected by RC differentiating circuits 20 and 22 to produce two 180° out-of-phase positive pulses (c), (d), FIG. 4(c) and FIG. 4(d). These pulses are inverted by $A_{21}$ and $A_{22}$, two of six inverters of the hex inverter-buffer 4049 integrated circuit ($A_2$). From the outputs of $A_{21}$ and $A_{22}$, there are two 180° out-of-phase negative pulses (e) and (f), FIG. 4(e) and FIG. 4(f), which are again inverted by $A_{23}$, $A_{24}$, $A_{25}$ and $A_{26}$, four inverters of the 4049 IC to produce two pairs of 180° out-of-phase positive pulses (g), (j) and (h), (i), FIG. 4(g), FIG. 4(j), FIG. 4(h) and FIG. 4(i). These pulses are then amplified by four transistor amplifiers 24, only one of which is shown. Each amplified pulse is then isolated by a pulse transformer 26 and rectified at 28 before being applied to a gate of one of the associated thyristors. Only the circuit for the lowermost control signal $V_{g3}$ is illustrated in FIG. 3, with the other signals (g), (h) and (j) being applied to similar circuits.

Figure 8:
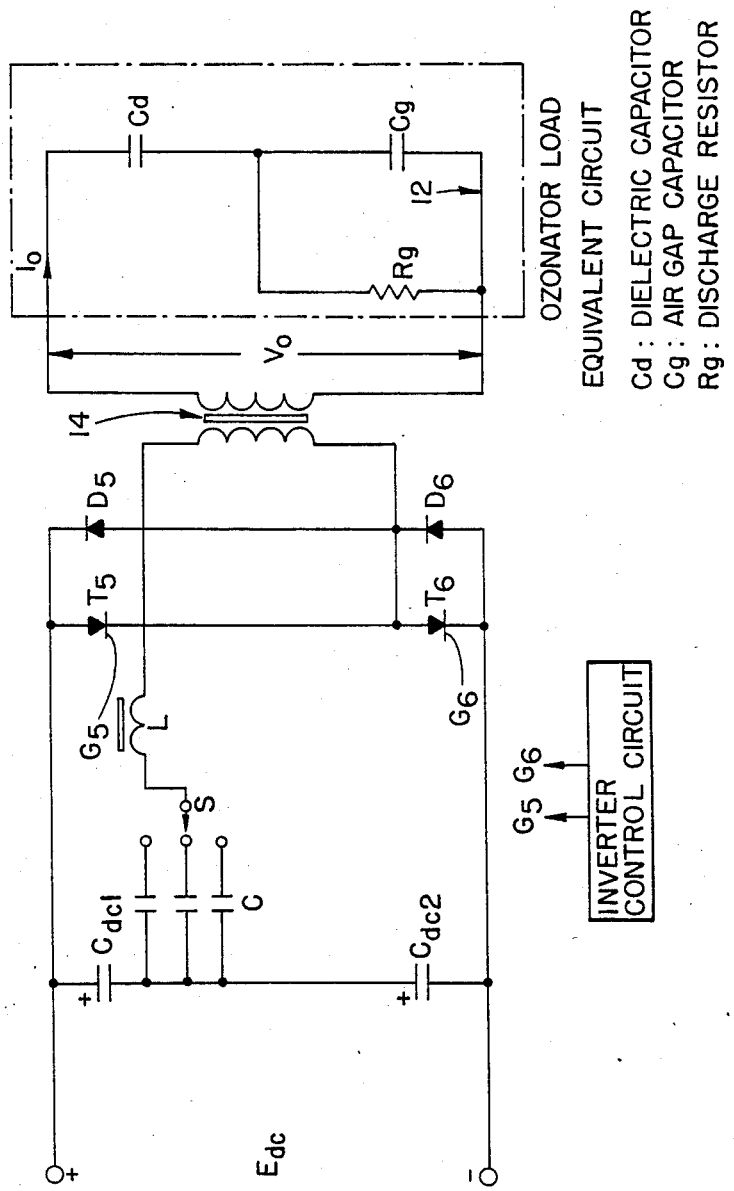
FIG. 8 is a circuit diagram of a half bridge thyristor power supply circuit.

The control circuit of FIG. 3 can also be utilized to control and drive a half bridge thyristor inverter power supply circuit as illustrated in FIG. 8. The operation of the circuit of FIG. 8 is similar to that of the FIG. 1 circuit. However, for the same output conditions as with the full bridge thyristor inverter of FIG. 1, the transformer turns ratio of the high voltage transformer of FIG. 8 must be doubled. Moreover, the half bridge thyristor circuit of FIG. 8 requires only the generation of the output signals $V_{g1}$ and $V_{g2}$ in FIG. 3, and accordingly the circuit components for generating the output signals $V_{g3}$ and $V_{g4}$ can be omitted from this embodiment.

Figure 5:
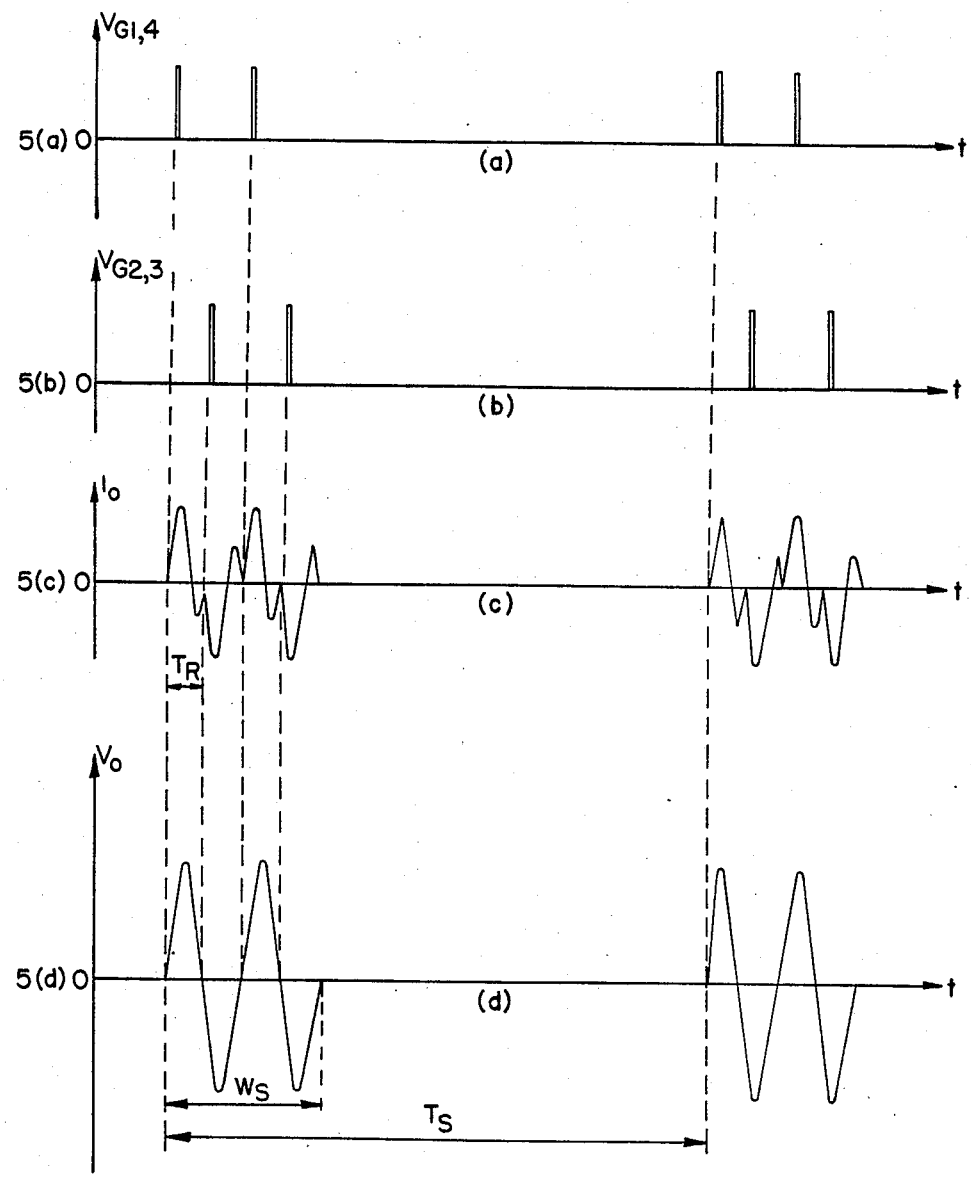
FIG. 5 illustrates various waveforms which are associated with and are useful in explaining the operation of the circuit of FIG. 1 in a pulse burst modulation mode.

A second embodiment of a pulse control circuit is designed and implemented using integrated circuits and transistors, as shown in FIG. 6, to generate a burst of pulses, illustrated in FIGS. 5(c) and 5(d), for the ozonator load. The operation of the inverter circuit of FIG. 1 in a pulse burst modulation mode is illustrated in FIG. 5.

In a preferred mode of pulse burst modulation, the pulse repetition frequency of the gating high frequency pulse train is set equal to one-half ($\frac{1}{2}$) the resonant frequency. Thyristors $T_1$ and $T_4$ are turned on by the first pulse gate signals $V_{g1}$, $V_{g4}$, causing a resonant current to flow through $T_1/T_4$ and the common branch of the bridge inverter circuit, establishing a first half cycle of positive voltage. After the cycle of the resonant current is completed, thyristors $T_2$ and $T_3$ are then turned on by the first pulse gate signals $V_{g2}$, $V_{g3}$. A resonant current then flows through $T_2/D_2$, $T_3/D_3$ and the common branch of the bridge inverter, but in a reverse direction, establishing a first half cycle of negative voltage. A full cycle of voltage is thereby established. Thyristors $T_1$ and $T_4$ are turned on again by the second pulse gate signals $V_{g1}$, $V_{g4}$, and the previous cycle of operation is repeated. The inverter is then off until the next cycle of the switching frequency and the above operation is repeated. The resonant load current $I_o$ and voltage waveform $V_o$ produced by this power supply are shown in FIGS. 5(c) and 5(d).

Figure 7:
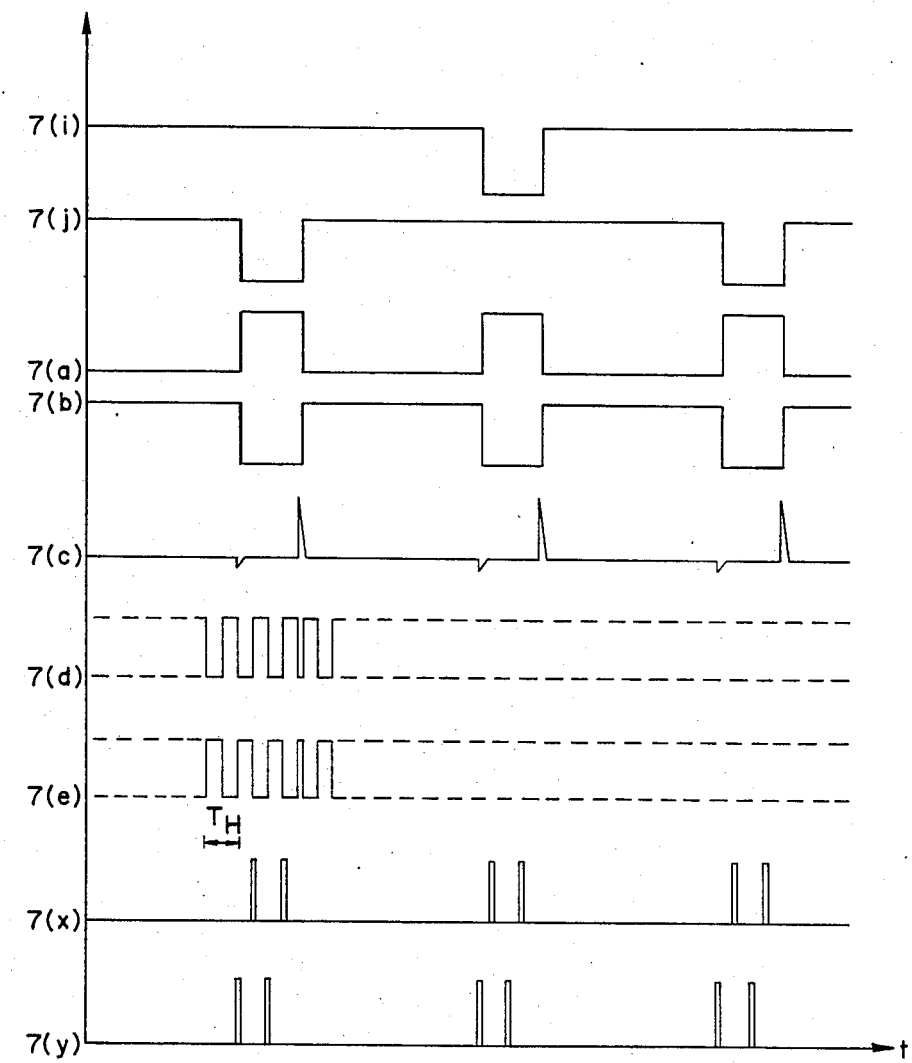
FIG. 7 illustrates various waveforms which are associated with and are useful in explaining the operation of the control circuit of FIG. 6.

Referring to FIGS. 6 and 7, an SG3524 ($A_1$) regulating pulse width modulator IC generates two 180° out-of-phase square wave signals (i) and (j), FIGS. 7(i), 7(j), which are buffered and inverted by $A_{31}$, $A_{32}$ of a 4049 ($A_3$) hex inverting buffer IC, after which they are coupled together to produce a single square wave switching frequency signal (a), FIG. 7(a), generally between 200 and 800 $H_z$. The switching frequency (Fs) and the width of this square wave signal are manually controllable by potentiometers $P_1$ and $P_2$, respectively, connected to the SG3524 IC as shown. This signal (a) is then divided, and one portion thereof is fed to one of two inputs of four AND gates ($A_{51}$, $A_{52}$, $A_{53}$, $A_{54}$) of a 4081 IC ($A_5$) quad two input AND gate, and the other portion thereof is buffered and inverted by $A_{33}$ to produce signal (b), FIG. 7(b), which is then edge detected by an RC differentiating circuit 30 to produce a pulse (c), FIG. 7(c), at the leading edge of the square wave signal, which is fed to a 4046 ($A_2$) phase lock loop IC as an enable input. The 4046 chip $A_2$ generates a high frequency pulse train, with the frequency of the high frequency pulse train generated by $A_2$ being controllable by a potentiometer $P_3$ connected thereto as shown, which is split in order to produce two 180° out-of-phase signals, one (d) of which is fed directly to two non-inverting buffers $A_{43}$, $A_{44}$ of a 4050 ($A_4$) IC, and the other of which is buffered and inverted by $A_{34}$ to produce signal (e), FIG. 7(e), which is fed to two other non-inverting buffer amplifiers $A_{41}$, $A_{42}$ of the 4050 $A_4$ IC. At the output of the $A_4$ IC, there are two pairs of signals, 180° out-of-phase, which are edge detected by RC differentiating circuits 32 at the leading edge of the high frequency pulse train before feeding into the second inputs of each AND gate $A_{51}$, $A_{52}$, $A_{53}$, $A_{54}$. Explained further, each AND gate receives two input signals, a switching frequency signal (a) and a high frequency signal (output of RC circuit 32), and produces an output gating signal only if both inputs are high. In the pulse burst modulation mode, the switching frequency of the square wave signal controls the timing between the pulse bursts, and the number of high frequency pulses within each pulse burst is controlled by the frequency of the high frequency pulse train or the width of each pulse in the square wave signal. Thus, at the outputs of $A_{51}$, $A_{52}$, $A_{53}$, $A_{54}$, there are two pairs of pulse trains (x) and (y), as shown in FIGS. 7(x) and 7(y), in which the number of pulses contained in the width of each switching frequency pulse is controlled by the width control potentiometer $P_2$ or by the high frequency control potentiometer $P_3$. Each of these pulses is amplified at 34, isolated at 36 and rectified at 38 before being directed to the gates of thyristors $T_1$, $T_2$, $T_3$ and $T_4$ of the inverter circuit of FIG. 1.

The control circuit of FIG. 6 can also be utilized to control and drive a half bridge thyristor inverter power supply circuit as illustrated in FIG. 8. However, the half bridge thyristor circuit of FIG. 8 requires only the generation of the output signals to $T_1$ and $T_2$ in FIG. 6, and accordingly the circuit components for generating $T_3$ and $T_4$ can be omitted from this embodiment.

FIG. 8 shows a half bridge thyristor arrangement variation of the circuit of FIG. 1. Two pairs of an antiparallel connected thyristor-diode ($T_5$, $D_5$, $T_6$, $D_6I$) connected in series with one another are connected to a DC source obtained from a AC/DC converter, not shown. Connected across the positive and negative input terminals are two series connected DC capacitors $C_{dc1}$ and $C_{dc2}$. The output of the half bridge inverter is taken between the two series connected DC capacitors and the two series connected thyristors. As in FIG. 1, a series resonant circuit connected in series with the primary winding of a high voltage transformer is connected to the output of the inverter. The operation of the circuit of FIG. 8 is similar to that of the FIG. 1 circuit. However, for the same output conditions as with the full bridge thyristor inverter of FIG. 1, the transformer turns ratio of the high voltage transformer of FIG. 8 must be doubled. The half bridge tryristor circuit of FIG. 8 can be controlled and operated by the exemplary control circuits of FIGS. 3 or 6, requiring only the output signals $V_{g1}$ and $V_{g2}$ in FIG. 3 and output signals to $T_1$ and $T_2$ in FIG. 6.

While several embodiments and variations of the present invention for an ozonator power supply thyristor inverter are described in detail herein, it should be apparent that the disclosure and teachings of the present invention will suggest many alternative designs to those skilled in the art.

What is claimed is:

1. A power supply circuit for an ozonator comprising:
    a. a DC/AC semiconductor switch bridge inverter coupled at its input terminals of a resonant network, said semiconductor switch bridge inverter comprising a first semiconductor switch means for conducting through the resonant network in a first direction and a second semiconductor switch means for conducting through the resonant network in a second direction;
    b. said resonant network having a step up high voltage transformer with its primary winding coupled to said semiconductor switch bridge inverter and its secondary winding coupled to the ozonator; and
    c. an inverter control circuit for controlling the gating electrodes of said first and second semiconductor switch means, said inverter control circuit comprising first and second AND gate means for controlling gating of said first and second semiconductor switch means, for generating a switching frequency square wave signal and applying it to a first input of each of said first and second AND gate means, and means for generating a high frequency pulse train and applying it to a second input of each of said first and second AND gate means, such that the first and second AND gate means generate gating signals to cause said first and second semiconductor switch means to operate in a pulse burst modulation mode wherein the switching frequency of the square wave signal controls the timing between pulse bursts, and the number of high frequency pulses within each pulse burst is controlled by the frequency of the high frequency pulse train and the width of each pulse in the square wave signal.

2. A power supply circuit as claimed in claim 1, said means for generating a high frequency pulse train operating between 1.0 and 1.6 kilohertz.

3. A power supply circuit as claimed in claim 1, said means for generating a switching frequency square wave signal operating between two hundred and eight hundred hertz.

4. A power supply circuit as claimed in claim 1, wherein a capacitance and an inductance are coupled to the primary winding of the transformer to tune the resonant frequency of the resonant network to the range of 2.0 to 3.0 kilohertz.

5. A power supply circuit as claimed in claim 4, wherein the pulse repetition frequency of the high frequency pulse train is one-half the resonant frequency.

6. A power supply circuit for an ozonator as claimed in claim 1, wherein said means for generating the square wave signal comprises a pulse width modulator for generating two out-of-phase square wave signals which are coupled together to produce a single square wave signal.

7. A power supply circuit for an ozonator as claimed in claim 1, said square wave signal being coupled to said means for generating the high frequency pulse train to synchronize the pulses in the high frequency pulse train with the pulses of the square wave signal.

8. A power supply circuit for an ozonator as claimed in claim 1, said semiconductor switch bridge inverter comprising a full bridge inverter wherein said first semiconductor switch means comprises a first pair of semiconductor switches, said first AND gate means comprises a first pair of AND gates, said second AND gate means comprises a second pair of AND gates, said means for generating a switching frequency square wave signal being cooled to a first input of each of said first and second pairs of AND gates, and said means for generating a high frequency pulse train being coupled to a second input of each of said first and second pairs of AND gates, such that the first and second pairs of AND gates generate gating signals to cause said first and second pairs of semiconductor switches to operate in a pulse burst modulation mode.

9. A power supply circuit for an ozonator as claimed in claim 1, said semiconductor switch means comprises a first semiconductor switch, said second semiconductor switch means comprises a second semiconductor switch, said first AND gate means comprises a first AND gate, and said second AND gate means comprises a second AND gate.

* * * * *